Dec. 30, 1924.
E. FLENTJE
1,521,218
SHOCK ABSORBER
Filed Nov. 30, 1923
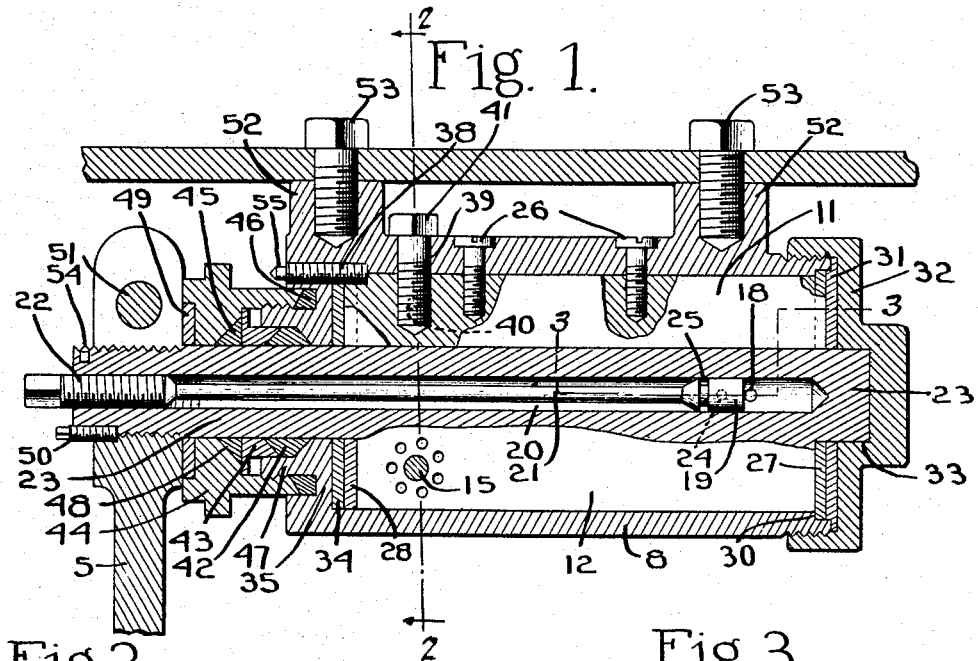
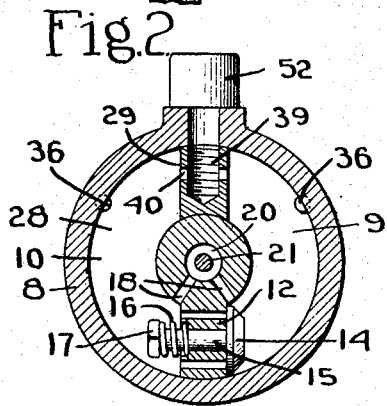
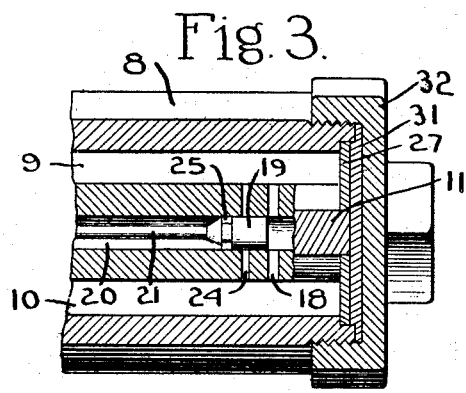
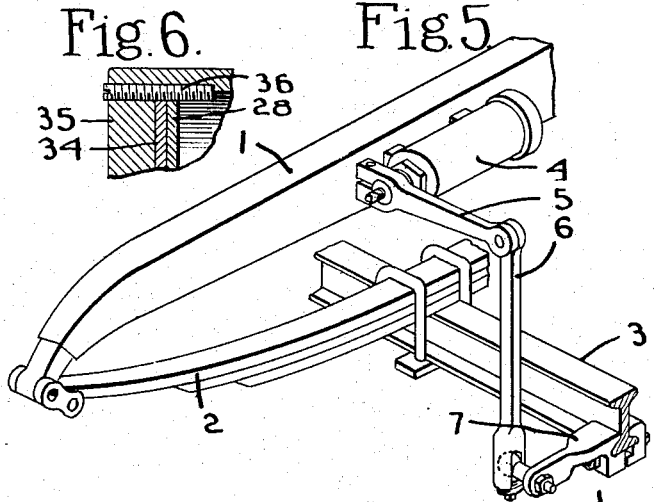
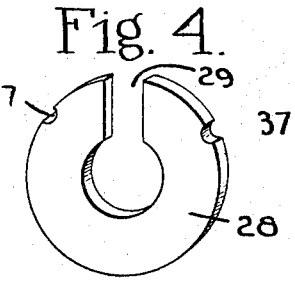
Inventor.
Ernst Flentje
by Heard Smith & Tennant.
Attys.

Patented Dec. 30, 1924.

1,521,218

UNITED STATES PATENT OFFICE.

ERNST FLENTJE, OF CAMBRIDGE, MASSACHUSETTS.

SHOCK ABSORBER.

Application filed November 30, 1923. Serial No. 677,664.

*To all whom it may concern:*

Be it known that I, ERNST FLENTJE, a citizen of the United States, and resident of Cambridge, county of Middlesex, State of Massachusetts, have invented an Improvement in Shock Absorbers, of which the following description, in connection with the accompanying drawing, is a specification, like characters on the drawing representing like parts.

This invention relates to a shock absorber of the hydraulic type and the general object thereof is to provide such a device which may be fastened on an automobile to operate in a horizontal position so that it may be used with low-hung cars.

One commonly used form of hydraulic shock absorber consists of a casing fastened in a vertical position to the frame of the automobile and a piston vertically movable within the casing. The casing, in order to adequately absorb severe shocks, must be quite long and in the usual shock absorber extends an appreciable distance below the frame of the automobile which is an objection to the use of these absorbers on the present type of low-hung automobiles. The shock absorber of the present invention is designed to operate when in a horizontal position and is preferably fastened to the frame of the automobile so as to extend longitudinally of the frame. The shock absorber does not extend below the lower edge of the automobile frame and therefore allows relative movement of the frame and axle of the automobile to the same extent as if the device were not used. The shock absorber may thus be used on low-hung cars in which the frame is quite close to the axle.

Another object of the invention is to provide a superior packing for hydraulic shock absorbers or similar devices to prevent the leakage of fluid therefrom.

Further objects of the invention are to provide a shock absorber, the operation of which may easily be adjusted by means exterior of the device; to provide a shock absorber which, although it may be adjusted, is so constructed that unskilled persons may not damage the device or cause it to become inoperative when seeking to adjust it; and to provide a novel and convenient means for filling the shock absorber with fluid.

Other objects and features of the invention are to generally improve the construction of shock absorbers as will more fully appear from the following description and accompanying drawings.

In order to give an understanding of the invention I have illustrated in the drawings a selected embodiment thereof which will now be described after which the novel features will be pointed out in the appended claims.

In the drawings:

Fig. 1 is a section taken longitudinally through the shock absorber;

Fig. 2 is a section on the line 2—2, Fig. 1 looking in the direction of the arrow;

Fig. 3 is a sectional detail on line 3—3, Fig. 1;

Fig. 4 is a perspective of a disk used at the end of the casing to hold the partition in place;

Fig. 5 is a perspective of the shock absorber applied to an automobile;

Fig. 6 is a fragmentary sectional view showing the locking screw for holding the slotted washer 28 in place.

Referring particularly to Fig. 5 of the drawings 1 indicates the frame section of an automobile connected by a spring 2 to the axle section 3 as is usual in automobile constructions. The shock absorber is indicated generally at 4 and is fastened to the frame section of the automobile in a substantially horizontal position to extend longitudinally of the frame. The shock absorber is connected by means of links 5 and 6 to a hanger 7 rigidly fastened on the axle 3.

The shock absorber comprises a fluid holding casing 8 within which is a partition dividing the casing into chambers 9 and 10 extending longitudinally thereof. The partition embodies a stationary partition member 11 and a movable partition member 12 abutting the stationary member and mounted for rotation in the casing so that when it rotates the volumes of the chambers 9 and 10 are changed. When the movable partition member rotates the fluid within the chambers passes from one chamber to the other by means of a plurality of ports through the partition. One of these ports is a valved port permitting the passage of fluid therethrough in only one direction and of such an area that when the port is opened the passage of fluid through said port offers no appreciable resistance to movement of the movable partition member. The valved port is closed by a valve having a head 14 and a stem 15 extending through the partition and is kept closed except when the movable partition member rotates in the proper direction, by means of a spring 16 surrounding the valve stem. The spring bears at one end against the partition and at the other end against a nut 17 on the end of the valve stem. The valved port may be of any form but is shown herein as a plurality of small holes through the partition.

A relief port 18 extends through the partition and is normally open at all times to permit the fluid within the casing to flow back and forth between the chambers 9 and 10. The relief port is smaller than the valved port and is of such a size that movement of the movable partition member is resisted in the direction in which the fluid may only pass through the relief port. When the automobile goes over a bump in the road the axle 3 of the automobile is forced toward the frame 1 and the movable partition member is rotated in the direction in which fluid is permitted to pass through the valved port. This movement is free and the shock absorber offers little or no resistance thereto since the fluid therein may readily pass from the chamber 10 into the chamber 9 by means of the valved port and the relief port. When the movement of the axle 3 toward the frame 1 ceases, however, spring 16 immediately closes the valved port and when the frame and axle tend to separate such movement is resisted since the fluid within the shock absorber may only flow from chamber 9 to chamber 10 through the relatively small relief port, but the frame 1 and axle 3 finally resume their normal positions since there is always communication afforded between the two chambers and fluid may always flow from one chamber into the other.

In order to control the rate at which the frame 1 and axle 3 are permitted to resume their normal positions, means are provided to change the area of the relief port. Such means is an adjustable closure 19 which may be moved across the relief port to change the size of the opening through which fluid may pass between the chambers. The closure is preferably located within the partition which has an opening 20 extending from a point near the relief port to the exterior of the shock absorber. The closure is adjusted by means extending from the closure to the exterior of the casing and such means is preferably a stem 21 fast to the closure and extending through the opening 20 to a position outside of the shock absorber where it may conveniently be reached for adjustment. The wall of the opening 20 near the open end thereof is threaded and the adjacent portion of the stem 21 is enlarged at 22 and correspondingly threaded to permit adjustment of the stem and closure by rotating the stem. The position of the closure 19 is indicated by the number of the exposed threads on the enlarged end 22 of the stem. While the opening 20 and closure 21 may have any shape it is preferable to make the opening circular in cross section and have the closure in the form of a plug the periphery of which closely fits against the wall of the opening to prevent the leakage of fluid from the casing through the opening 20. In the preferred form of construction the movable member rotates on an axle 23 and the relief port extends through the axle to provide communication between the chambers. The opening 20 is formed longitudinally through the center of the axle and the adjustable closure is within the axle adjacent the relief port. The stem for adjusting the position of the closure extends through the hollow axle to the exterior of the shock absorber in order that the closure may be adjusted without disturbing the assembly of the parts of the device. The end of the stem is squared to present a surface which may easily be gripped when the closure is to be adjusted. The adjustable closure is used in connection with the relief port to permit adjustment of the shock absorber so that one standard size of shock absorber may be used in conjunction with springs of different strengths. Thus the shock absorbers on the same car may be adjusted to allow an even recoil of the springs although they may be of varying resilience and the same size shock absorber may be used on cars of different makes having springs of different strengths.

In order to prevent the entire closing off of communication between the chambers 9 and 10 when unskilled persons seek to adjust the size of the relief port, an auxiliary port 24 is provided which extends through the partition near the relief port. The closure is cut away at 25 so that when the closure is adjusted either the relief port or the auxiliary port may be closed and the area of the ports adjusted but both ports may not entirely be closed at the same time. The closure may also be adjusted so that both the relief port and the auxiliary port may be entirely opened to permit the quick flow of oil from chamber 9 to chamber 10 to lessen the resistance of the absorber to recoil of the springs. When the parts are in the position shown in the drawings the auxiliary port is closed and the relief port is entirely open but it will readily be seen that by screwing the stem in the proper direction the closure 19 may be moved to close off the relief port but before the relief port is entirely shut the cut away portion 25 of the closure is in position to permit the passage of fluid between the chambers through the auxiliary port and said cut away portion. The relief port 18 and auxiliary port 24 constitute a by-pass through the partition and the closure 19 provides means for adjusting the effective area of the by-pass, which means, however, is incapable of entirely closing the by-pass.

It is evident that when severe shocks are to be absorbed the partition member within the shock absorber is subjected to heavy strain. In order to hold the stationary partition member rigidly in position screws 26 pass through the wall of the casing into said stationary member and anchoring disks 27 and 28, each having a slot 29 to receive the end of the stationary member, are rigidly fastened at each end of the casing. The anchoring disk 27 is slightly larger than the internal diameter of the casing and the casing is cut away to form a shoulder 30 against which the disk bears. A washer 31 fits in between the anchoring disk 27 and a cap 32, which screws on the end of the casing, closes the end thereof and provides a bearing 33 for the movable member and firmly secures the disk in place to prevent movement of the stationary member with the movable member. A washer 34 fits in between the anchoring disk 28 and the head 35 of the casing which closes the end thereof and both the washer and anchoring disk 28 are prevented from rotating by pins 36 projecting from the closed end of the casing and engaging the washer and disk. These pins are partially embedded in the wall of the casing and partially embedded in the disk, grooves 37 in the disk being provided for that purpose. The pins also project past the disk into the path of movement of the movable member to limit the movement thereof. The screw 38 extends through the head of the casing and is partially embedded in the casing wall and in the stationary partition member to provide additional means for holding the stationary partition member securely in place.

To permit the filling or emptying of the shock absorber the partition and casing have a filling opening 39 passing through the casing wall into the partition and the partition has a passage 40 providing communication between the filling opening and the chambers. The filling opening is threaded and is closed by a screw 41 which is screwed into the opening. The filling opening in the partition is long enough to permit the screw 41 to extend well into the partition and the screw is long enough to extend nearly to the bottom of the opening whereby with the screw in place the filling opening is closed and the screw assists the screws 26 in securely holding the stationary partition member in place.

The superior packing which is provided to prevent the leakage of fluid from the casing comprises a stuffing box which includes a packing 42 and a packing gland 43 and a packing nut 44 with additional packing at 45 between the packing nut and packing gland and at 46 between the packing nut and casing head. In order to provide spaces for these packings a cylindrical flange 47 extends from the casing head parallel and spaced from the axle and a recess to receive the packing 46 is formed around the outer periphery of the flange. The inner wall of the packing nut is bevelled at 48 to provide space for the packing 45 between said packing nut and the packing gland. The packing nut is threaded on the flange 47 in the usual manner. It will thus be seen that when the packings 42, 45, and 46 are in place and the packing nut is tightened on the flange there are two packings in each path by which the fluid might escape from the casing. Thus packings 42 and 45 are in series and prevent the escape of fluid along the axle of the movable partition member and packings 42 and 46 are in series and prevent the escape of fluid around the flange 47.

The link 5 is threaded on the axle of the movable member and bears against a bearing washer 49 placed between the packing nut and the adjacent portion of the link. By tightening the link against the packing nut and bearing washer the movable partition member is drawn against the disk 28 and thus the leakage of fluid from one chamber to the other around the end of the movable partition member is prevented. The link 5 is securely fastened to the end of the axle 23 of the movable member not only by being threaded thereon but also by a locking screw 50 and a bolt 51 by which the bifurcated ends of the link are clamped together around the end of the axle of the movable member. The casing of the shock absorber may be secured in position in any desired manner but in the preferred construction threaded bosses 52 project from the casing and receive screws 53 which pass through the frame section of the automobile and into the bosses.

When applying the shock absorbers to an automobile it is desirable to know the exact angular location of the movable partition member. For this purpose a pin 54 is set in the axle 23 in the plane of the movable member and points in a direction exactly opposite to that of the movable member. Co-operating with the pin 54 is a pointed pin 55 which may conveniently be a portion of the screw 38 and this pin gives the position of the stationary partition member. Thus in setting the shock absorber if the pins 54 and 55 lie in the same plane it is certain that the movable partition member is in alignment with the stationary partition member.

Having thus described the invention what is claimed as new and desired to be secured by Letters Patent is:

1. A shock absorber comprising a fluid holding casing, a partition dividing the casing into chambers and embodying a fixed partition member and a movable partition member having associated therewith an axle on which it turns, said axle having an axial bore and having therethrough two by-pass ports which communicate with said bore, a piston valve operating in said bore for controlling said ports, a stem secured to said piston valve which has screw-threaded engagement with the axle and which extends beyond the latter and by which the piston valve is adjusted, said ports and piston valve having such relation that either port may be closed by adjusting the piston rod but both ports cannot be simultaneously closed.

2. A shock absorber comprising a fluid holding casing a partition dividing the casing into chambers extending longitudinally thereof and embodying a movable partition member, said partition having a valved port and a relief port and an auxiliary port therethrough affording communication between said chambers, means co-operating with the relief and auxiliary ports by which either the relief or the auxiliary port may be closed and the area of the ports adjusted but both ports may not entirely be closed at the same time.

3. A shock absorber comprising a fluid holding casing, a partition dividing the casing into chambers extending longitudinally thereof and embodying a movable partition member, said partition having a valved port and a relief port and an auxiliary port therethrough affording communication between said chambers, means operable from the exterior of the casing co-operating with the relief and auxiliary ports by which either the relief or the auxiliary port may be closed and the area of the ports adjusted but both ports may not entirely be closed at the same time.

4. A shock absorber comprising a fluid holding casing, a partition dividing the casing into communicating chambers and embodying a stationary partition member, means for holding the stationary partition member in place comprising screws passing through the casing into said member and an anchoring disk having a slot to receive the end of the member rigidly fastened within the casing, said screws and disk preventing movement of said member.

5. A shock absorber comprising a fluid holding casing, a partition dividing the casing into communicating chambers and embodying a stationary partition member and a movable partition member abutting the stationary member, means for holding the stationary member in place comprising an anchoring disk at the end of the casing having a slot to receive the end of the stationary member and a cap closing the end of the casing providing a bearing for said movable member and firmly securing the disk in place to prevent movement of the stationary member with the movable member.

6. A shock absorber comprising a fluid holding casing, a partition dividing the casing into chambers extending longitudinally thereof and embodying a stationary partition member and movable partition member abutting the stationary partition member, means for holding the stationary member in place and preventing movement thereof with the movable member comprising a stationary anchoring disk within the casing at each end thereof having a slot to receive the end of the stationary member, a cap closing the open end of the cylinder providing a bearing for said rotatable member and firmly securing in place the disk adjacent the open end of the casing, and pins projecting from the closed end of the cylinder into the path of movement of the movable member and engaging the disk adjacent said closed end to prevent rotation of the disk and limit the movement of the movable member.

7. A shock absorber comprising a fluid holding casing, a partition within the casing dividing the casing into communicating chambers, the partition and casing wall having a filling opening passing through said wall into the partition and the partition having a passage providing communication between said filling opening and the chambers, and a screw removably closing the filling opening.

8. A shock absorber comprising a fluid holding casing, a partition dividing the casing into communicating chambers embodying a stationary partition member abutting the wall of the casing, said partition and wall having a screw threaded filling opening passing through said wall into the partition and the partition having a passage providing communication between said filling opening and the chambers, and a screw closing said filling opening of such a length that it extends well into the partition opening, whereby with said screw removed access may be had to the interior of the casing and the chamber filled with fluid through the filling opening and passage, and with the screw in place access to the interior of the casing is prevented and the stationary partition member is securely held in place.

9. A shock absorber comprising a fluid holding casing presenting a casing head, a partition dividing the casing into communicating chambers and embodying a removable partition member having an axle extending through the cylinder head, a stuffing box for preventing leakage of the fluid around the axle including a packing and a packing gland and a packing nut, and additional packing between said nut and gland and between said nut and casing head.

10. A shock absorber comprising a fluid holding casing presenting a casing head, a partition dividing the casing into communicating chambers and embodying a movable partition member having an axle passing through the casing head, a cylindrical flange extending from the casing head parallel with and spaced from the axle with a recess in the casing head around the outer periphery of the flange, a packing gland surrounding the axle and fitting into the space between said flange and axle, a packing nut threaded on said flange with a rim extending into said recess, and packing in said recess and in said space between the flange and the axle and between said packing nut and said packing gland.

In testimony whereof, I have signed my name to this specification.

ERNST FLENTJE.